July 18, 1967
D. E. LIGON
3,331,130
SUCTION HEAD FOR BARBER SHEARS
Filed Oct. 20, 1965
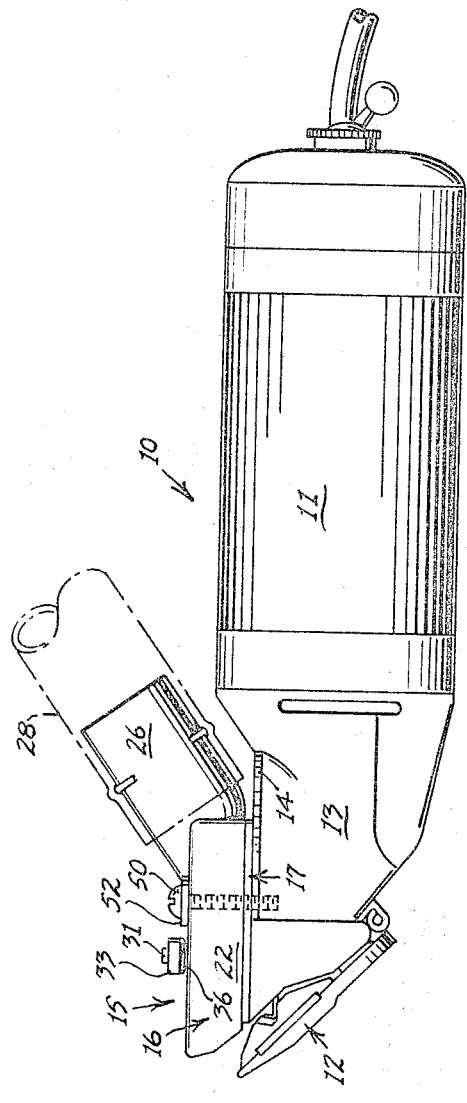
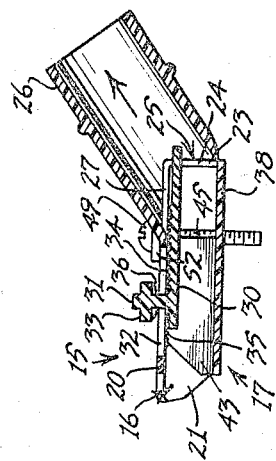
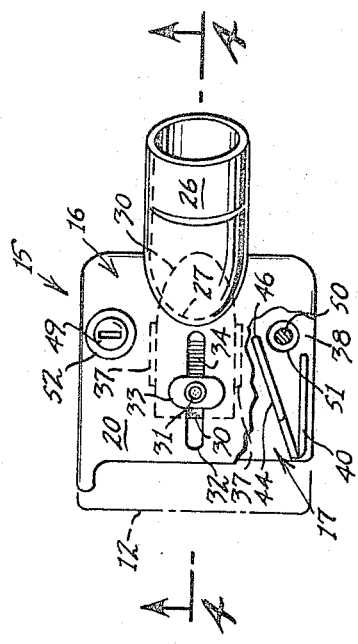
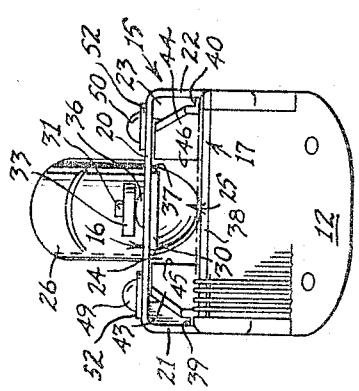
INVENTOR:
D. ELMON LIGON
BY
Harrington A. Lackey
ATTORNEY 000
United States Patent Office 3,331,130
Patented July 18, 1967

3,331,130
SUCTION HEAD FOR BARBER SHEARS
D. E. Ligon, Springfield, Tenn., assignor to Nasco, Inc., Springfield, Tenn., a corporation of Tennessee
Filed Oct. 20, 1965, Ser. No. 498,645
5 Claims. (Cl. 30—133)

This invention relates to a suction head for barber shears or clippers, and more particularly to an improved suction head having more versatility for controlling the flow of air therethrough and with relation to the shears.

Although suction heads for barber shears are old in the art, such suction heads are generally fixed in relation to the blades or cutter head of the shears, or at best are provided with limited controls for regulating the vacuum or flow of air relative to the shears.

It has been found in the use of conventional suction heads with barber shears that the flow of air may be excessive or inadequate for the particular type of trimming or cutting to be performed on different customers. Moreover, because of the generally wide mouth or suction inlet of the suction head, which is adapted to span the cutting blades on the shears, and the generally small and centrally disposed suction outlet of the suction head, the vacuum distribution across the suction inlet is not uniform, the vacuum being more concentrated in the middle portion than at the opposite extremities of the suction inlet. Such non-uniform vacuum distribution in the suction head therefore produces inadequate removal of the cut hairs, or requires extra time in moving the suction head over areas already cut in order to remove substantially all the clippings or cut hairs. Such repeated movements of the suction head also subject hair already cut to being inadvertently cut shorter by the shears unless the operator is careful.

It is therefore an object of this invention to overcome the above disadvantages by providing a suction head for barber shears provided with means for effecting more uniform distribution of air flow through the suction inlet.

Another object of this invention is to provide a suction head for barber shears particularly adapted for adjustment with respect to the shear blades to afford the desired amount of suction for the type of cutting or trimming performed.

Another object of this invention is to provide a suction head for barber shears having a suction outlet and valve cover adapted to be easily manipulated by the operator for not only opening and closing the suction outlet, but also for adjusting the strength of the vacuum at the suction inlet.

A further object of this invention is to provide a suction head for barber shears made in two pieces, a top piece interchangeable with other top pieces of uniform construction, and a bottom piece interchangeable with other bottom pieces having different constructions for mounting upon barber shears or clippers of different makes.

Another object of this invention is to provide a two-piece suction head for barber shears, and means for adjustably securing the two pieces to each other and to the shears.

A further object of this invention is to provide a suction head for barber shears of comparatively simple and inexpensive construction and adapted for mass production.

Further objects and advantages of the invention will be apparent from the following description taken in conjunction with the drawings, wherein:

FIG. 1 is a side elevation of the invention mounted upon a set of barber shears;

FIG. 2 is a front end view of the suction head and shears disclosed in FIG. 1;

FIG. 3 is a top plan view, with parts broken away, of the suction head shown in FIGS. 1 and 2; and with the shear blades shown in phantom; and FIG. 4 is a section taken along the line 4—4 of FIG. 3.

Referring now to the drawings in more detail, FIG. 1 discloses a set of barber shears or clippers 10, and specifically a set of "Oster" clippers, having a main body 11 also used as a handle, a cutter head 12 including the shear blades, and a neck portion 13 connecting the body 11 and the cutter head 12. It will be noted in FIGS. 1 and 2 that the top surface of the neck plate 14 of the "Oster" clippers is substantially flat.

The suction head 15 made in accordance with this invention comprises a casing made in two pieces, an upper piece 16 and a lower piece 17.

The upper piece 16 preferably includes a top wall 20 and a pair of opposed side walls 21 and 22, which may be substantially parallel, and depending from the opposite side edges of the top wall 20. The upper piece 16 also includes a rear wall 23 having a centrally disposed rear opening 24 forming a portion of the suction outlet 25. Communicating with the rear opening 24 and secured to the rear wall 23 and top wall 20 is a tubular member 26 extending upwardly and rearwardly from the upper piece 16, and preferably molded as a part thereof. If desired, the rear portion of the top wall 20 within the tubular member 26 may have an opening 27 forming part of the suction outlet 25. The tubular member 26 is preferably cylindrical and projects upwardly far enough to receive and act as a coupling member for the end of the suction hose 28 (FIG. 1), which extends and is coupled to a vacuum pump or any other means, not shown, for creating suction within the hose 28.

A cover or slide plate 30 is mounted to reciprocably move forward and backward relative to the top wall 20 in order not only to open and close the suction outlet 25, but also to vary the size of the suction outlet 25, and consequently the degree of suction in the suction head 15. As shown, particularly in FIGS. 3 and 4, a button or button-type projection 31 extends upwardly from the cover 30 through an elongated slot 32, the button 31 being provided with a flange 33 transversely disposed above the slot 32. Serrations 34 are longitudinally spaced along the top of the cover 30 and adapted to mesh with serrations 35 formed on the bottom surface of top wall 20 on opposite sides of the elongated slot 32. The spring 36, acting between the top wall 20 and flange 33, biases the cover plate 30 upwardly so as to ensure proper meshing with the serrations 34 and 35. When the button 31 is depressed against the action of the spring 36, the serrations are dis-engaged so that the cover plate 30 may be freely moved longitudinally of the top wall 20 between the guides 37 depending from the top wall 20, to open and close the suction outlet 25. Thus, the cover 30 is designed not only to open and close the tubular member 26, but also to be held in various adjusted positions to increase and decrease the size of the opening in the tubular member 26.

The lower piece 17 includes the bottom wall 38 of the suction head 15. Spaced proximate to the opposite side edges of the bottom wall 38 and projecting upwardly from the bottom wall 28 are a pair of parallel guide ribs 39 and 40. As best disclosed in FIG. 2, each rib 39 and 40 is spaced apart from its corresponding bottom wall edge a distance equal to the thickness of each side wall 21 and 22. The ribs 39 and 40 are designed to guide the side walls 21 and 22 slidably and longitudinally of the bottom plate 38, as well as positioning the upper piece 16 and lower piece 17 relative to each other when assembled.

Also projecting upwardly from the bottom wall 38 are a pair of inner walls 43 and 44, spaced from the corresponding side walls 21 and 22, and diverging from their rear ends 45 and 46, spaced adjacent to the suction outlet 25, forwardly until the front ends of the inner walls 43 and 44 are slightly spaced apart from the corresponding side walls 21 and 22. The purpose of these diverging inner walls 43 and 44 is to produce a Venturi effect at the extremities of the suction inlet or mouth of the suction head 15 and thereby assure a more uniform suction or air flow distribution across the mouth of the suction head. Without the inner walls 43 and 44, there would normally be maximum suction in the middle portion of the suction inlet, with the suction distribution tapering off toward the lateral extremities. It will be noted that the rear ends 45 and 46 of the inner walls 43 and 44 terminate in the vicinity of the suction outlet 25. Moreover, the rear ends 45 and 46 do not connect with any of the side walls 21, 22 or the rear wall 23 of the suction head 15, and they are spaced apart from each other sufficiently not to interfere with normal suction distribution in the central portion of the suction head 15, between the inner walls 43 and 44.

The upper piece 16 and the lower piece 17 are secured together and to the neck portion 13 of the shears, preferably by the threaded bolts 49 and 50. Each bolt 49 and 50 extends through an over-sized hole, not shown, in the top wall 20, and then through over-sized holes, such as 51, in the bottom wall 38. The bolts 49 and 50 are then threaded into existing mating threaded holes in the top plate 14 and the neck portion 13. Washers, such as 52, are employed to prevent the bolt head from slipping through the over-sized holes in the top wall 20. By including the over-sized holes, such as 51, in both the top wall 20 and the bottom wall 38, the upper piece 16 and the lower piece 17 are permitted limited longitudinal adjustment with respect to each other, and with respect to the cutter head 12, in order to adjust the effective size of the suction inlet into the suction head 15 for various types of cutting and trimming operations.

Although the upper piece 16 of the suction head 15 is a standard part regardless of the type of shears upon which the suction head 15 is mounted, the lower piece 17 is interchangeable with other slightly modified lower pieces, particularly adapted for mounting on the particular shears desired. For example, the "Andis" shears and the "Wahl" shears have neck portions with slightly different shapes requiring differently shaped lower pieces in order to mount the suction head 15 in its proper position relative to the cutter head 12.

It will thus be seen that by substantially aligning the over-sized holes in the upper piece 16 and the lower piece 17, then inserting and threading the bolts 49 and 50 through the over-sized holes into the threaded openings in the neck portion 13, the suction head 15 is readily mounted in position on the shears 11. Just before the bolts 49 and 50 are tightened, the upper piece 16 and the lower piece 17 may be adjusted longitudinally with respect to the neck plate 14, and also with respect to each other to provide the proper spacing between the front ends of the upper and lower pieces 16 and 17 and the cutter head 12. After the desired adjustment is attained, the bolts 49 and 50 are then tightened and the shears 10 are ready for operation.

With the shears 10 in operation, the inner walls 43 and 44 automatically provide a substantially uniform suction distribution across the suction inlet, so that the removal of hairs from the customer's head will be uniform for each swath of the cutter head 12. Thus, both hair and air are drawn through the common suction outlet 25 and up through the tubular member 26 and hose 28.

By manipulating the button 31 the cover plate 30 may be adjusted to provide the desired opening in the suction outlet 25 to produce the desired vacuum strength across the mouth of the suction head 15.

It will be apparent to those skilled in the art that various changes may be made in the invention without departing from the spirit and scope thereof, and therefore the invention is not limited by that which is shown in the drawings and described in the specification, but only as indicated in the appended claims.

What is claimed is:

1. A suction head for barber shears including a body and a cutter head at one end of said body, comprising:
    (a) a casing having a bottom wall, a top wall, opposed side walls, a front end and a rear end,
    (b) a suction inlet in said front end,
    (c) a suction outlet in said rear end,
    (d) first and second inner walls, each inner wall having a front end and a rear end,
    (e) said inner walls being mounted within said casing to span the full height of said casing between said top and bottom walls,
    (f) said first inner wall being spaced closer to one than the other of said side walls, and converging forwardly toward said one side wall,
    (g) said second inner wall being spaced closer to said other side wall than said one side wall, and converging forwardly toward said other side wall,
    (h) said front end of each inner wall being spaced apart from said corresponding side wall adjacent said suction inlet a distance less than the spacing between the corresponding rear end of each inner wall and the corresponding side wall, to create a Venturi effect in said suction inlet between each inner wall and said corresponding side wall when fluid is drawn through said casing,
    (i) said rear ends of said inner walls being spaced from said suction outlet and spaced from each other a distance less than the spacing between the front ends of said corresponding inner walls, and
    (j) means fixing said bottom wall upon the body of said shears so that said suction inlet lies adjacent said cuter head.

2. The invention according to claim 1 further comprising a valve cover for opening and closing said suction outlet, and means movably mounting said valve cover on said top wall.

3. The invention according to claim 2 in which said suction outlet comprises an opening in the rear end of said casing and a tubular member communicating with said opening and extending upwardly and rearwardly from said casing, said valve cover comprising a plate member slidably mounted on said top wall for reciprocable movement across said opening.

4. The invention according to claim 3 in which the means for mounting said plate member comprises means for locking said plate member in various adjusted positions relative to said opening to vary the size of the fluid passage through said tubular member.

5. The invention according to claim 1 in which said casing comprises two pieces, one piece including the top wall, side walls and the suction outlet, and said second piece including said bottom wall, said fixing means comprising a threaded bolt member for securing said first piece to said second piece and both pieces to said shears, aligned oversized holes in said top wall and said bottom wall for receiving said bolt member and permitting limited adjustment of said first and second pieces relative to each other and to said shears.

References Cited

UNITED STATES PATENTS

| | | | |
|---|---|---|---|
| 1,782,882 | 11/1930 | Rippey | 15—419 X |
| 2,581,002 | 1/1952 | Creswell | 15—420 |
| 2,697,876 | 12/1954 | Blanchard | 30—133 |
| 2,946,122 | 7/1960 | Gaskins | 30—133 |
| 2,946,123 | 7/1960 | Bray | 30—133 X |

WILLIAM FELDMAN, *Primary Examiner.*

G. WEIDENFELD, *Assistant Examiner.*